US012305077B2

United States Patent
Ha et al.

(10) Patent No.: US 12,305,077 B2
(45) Date of Patent: *May 20, 2025

(54) MATTING AGENT INCLUDING EMULSION POLYMER PARTICLES, MATTING POLYMER COMPOSITION INCLUDING MATTING AGENT, AND METHOD OF PRODUCING EMULSION POLYMER PARTICLES

(71) Applicant: HANNANOTECH CO., LTD., Daejeon (KR)

(72) Inventors: Doo Han Ha, Yeosu-si (KR); Soo Wan Kim, Daejeon (KR)

(73) Assignee: HANNANOTECH CO., LTD., Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,881

(22) Filed: Aug. 31, 2022

(65) Prior Publication Data

US 2023/0073380 A1 Mar. 9, 2023

(30) Foreign Application Priority Data

Sep. 1, 2021 (KR) .......................... 10-2021-0116562

(51) Int. Cl.
| | | |
|---|---|---|
| C09D 7/42 | (2018.01) | |
| C08F 2/18 | (2006.01) | |
| C08F 279/04 | (2006.01) | |
| C08F 283/10 | (2006.01) | |
| C09D 7/40 | (2018.01) | |
| C09D 155/02 | (2006.01) | |
| C08F 220/36 | (2006.01) | |
| C08F 222/20 | (2006.01) | |
| C08F 224/00 | (2006.01) | |

(52) U.S. Cl.
CPC .................. *C09D 7/42* (2018.01); *C08F 2/18* (2013.01); *C08F 279/04* (2013.01); *C08F 283/105* (2013.01); *C09D 7/69* (2018.01); *C09D 155/02* (2013.01); *C08F 220/36* (2013.01); *C08F 222/20* (2013.01); *C08F 222/205* (2020.02); *C08F 224/00* (2013.01); *C08F 283/10* (2013.01)

(58) Field of Classification Search
CPC ...... C09D 7/42; C08F 279/04; C08F 283/105; C08F 283/10; C08F 222/20; C08F 222/205; C08F 222/36; C08F 224/00
See application file for complete search history.

(56) References Cited

U.S. PATENT DOCUMENTS

| | | | | |
|---|---|---|---|---|
| 3,189,571 | A | * | 6/1965 | Pavlin .................. C08K 5/1515 |
| | | | | 524/754 |
| 5,025,060 | A | * | 6/1991 | Yabuta .................. C08F 290/04 |
| | | | | 524/556 |
| 5,061,754 | A | | 10/1991 | Dufour et al. |
| 5,580,924 | A | | 12/1996 | Wildi et al. |

FOREIGN PATENT DOCUMENTS

| | | | |
|---|---|---|---|
| JP | 2000516284 | A | 12/2000 |
| JP | 2011089092 | A * | 5/2011 |
| JP | 2018526524 | A | 9/2018 |
| KR | 930017975 | A | 9/1993 |
| KR | 100321869 | B1 | 8/2002 |
| KR | 20070096463 | A | 10/2007 |
| KR | 20080025031 | A | 3/2008 |
| KR | 20080025032 | A | 3/2008 |
| KR | 20090081176 | A | 7/2009 |
| KR | 20100019474 | A | 2/2010 |
| KR | 20100065939 | A | 6/2010 |
| KR | 20100065989 | A | 6/2010 |
| KR | 20110066556 | A | 6/2011 |
| KR | 20150125248 | A | 11/2015 |

OTHER PUBLICATIONS

Korean Intellectual Property Office, Office Action Issued in Application No. 10-2021-0116562, Oct. 24, 2021, 15 pages.
Korean Intellectual Property Office, Notice of Allowance Issued in Application No. 10-2021-0116562, Feb. 15, 2022, 8 pages. (Submitted with Partial Translation).

* cited by examiner

*Primary Examiner* — Ling Siu Choi
*Assistant Examiner* — David L Miller
(74) *Attorney, Agent, or Firm* — McCoy Russell LLP

(57) ABSTRACT

The present disclosure relates to a matting agent including emulsion polymer particles, a matting polymer composition including a matting agent, and a method of producing emulsion polymer particles. The emulsion polymer particles may be produced by a simple process using an emulsion polymerization method, and have the advantage of being relatively easy to control a degree of crosslinking. In addition, in a case where a matting polymer composition is prepared using a matting agent including the emulsion polymer particles, it is possible to manufacture a molded article having excellent appearance and matting effect without deterioration of the existing mechanical properties such as impact strength and tensile strength of a thermoplastic polymer, and in particular, an excellent matting effect may be exerted even in the extrusion processing, which has been difficult to achieve in the related art.

10 Claims, No Drawings

MATTING AGENT INCLUDING EMULSION POLYMER PARTICLES, MATTING POLYMER COMPOSITION INCLUDING MATTING AGENT, AND METHOD OF PRODUCING EMULSION POLYMER PARTICLES

CROSS-REFERENCE TO RELATED APPLICATION

The present application claims priority to Korean Patent Application No. 10-2021-0116562, filed on Sep. 1, 2021. The entire contents of the above-listed application are hereby incorporated by reference for all purposes.

TECHNICAL FIELD

The following disclosure relates to a matting agent including emulsion polymer particles, a matting polymer composition including a matting agent, and a method of producing emulsion polymer particles.

BACKGROUND

As electric vehicles become more common, in the vehicle industry, weight reduction issues are becoming more important, and various attempts have been made to achieve weight reduction. As typical examples, there have been attempts to remove a metal material, such as replacing a metal material of a vehicle body with light and high-strength engineering plastic, and fixing existing parts bonded by a combination of bolts and nuts with an adhesive.

In addition, the trend is changing from expression of various colors and textures by painting interior/exterior materials of vehicles to an increase in preference for products having a low-gloss or matte texture in accordance with weight reduction issues, environmental issues, the problem of driver's driving in reaction to light reflection on a painted surface, and the enhancement of interior design.

As a method of reducing gloss, a resin may be injected into a mold with a corrosive surface, but this does not exert a sufficient matting effect, and alternatively, an inorganic filler may be added, but a sufficient matting effect may be exerted when an excessive amount of the inorganic filler is used, and mechanical strength is insufficient when the inorganic filler is used in excess, and thus the use of the inorganic filler is significantly limited.

U.S. Patent Application Publication No. 5580924 discloses that a crosslinked styrene acrylonitrile (SAN) copolymer is produced by synthesizing a styrene-acrylonitrile copolymer and blending the styrene-acrylonitrile copolymer with 3,4-epoxycyclohexyl-3,4-epoxycyclohexyl carboxylate through a reaction extruder in order to reduce gloss of a bisphenol A polycarbonate (PC). However, the prior art is limited to manufacturing a molded article having excellent quality, because surface foreign substances such as black spots are generated during reaction extrusion, it is difficult to improve a color, difficulties in dissolution are caused due to the difficulty of controlling a crosslinking point, and appearance defects occur.

Therefore, research and development of a matting additive that has an excellent matting effect, prevents deterioration of mechanical properties, and may exhibit excellent quality appearance has been urgently demanded.

SUMMARY

An embodiment of the present disclosure is directed to providing a novel matting agent including emulsion polymer particles and a method of producing emulsion polymer particles.

Another embodiment of the present disclosure is directed to providing a specific matting polymer composition including the matting agent, and a molded article having an excellent matting effect, excellent mechanical properties, and excellent quality appearance by extrusion or injection-molding processing of the composition.

In order to solve the above problems, the present inventors produced emulsion polymer particles using a polymerizable composition including an aromatic vinyl compound, an unsaturated nitrile compound, and an alicyclic epoxy compound by an emulsion polymerization method that has not been attempted in the related art. The present inventors have found that a degree of crosslinking may be relatively easily controlled by the emulsion polymer particles, and a matting agent and a matting polymer composition including the emulsion polymer particles may exert an excellent matting effect without deterioration of the existing physical properties of a thermoplastic polymer even with the addition of a small amount, and may manufacture a molded article having excellent quality appearance, thereby completing the present disclosure.

In one general aspect, a matting agent includes emulsion polymer particles, wherein the emulsion polymer particles are produced using a polymerizable composition including an aromatic vinyl compound, an unsaturated nitrile compound, and an alicyclic epoxy compound, and an epoxy group of the alicyclic epoxy compound is ring-opened.

The alicyclic epoxy compound may have two or more epoxy groups, and the alicyclic epoxy compound may be one or more selected from the group consisting of 3,4-epoxycyclohexylmethyl 3,4-epoxycyclohexane-carboxylate, diethylene glycol bis(3,4-epoxycyclohexane-carboxylate), 2-ethyl-1,3-hexanediol bis(3,4-epoxycyclohexane-carboxylate), diethylene glycol bis(3,4-epoxy-6-methylcyclohexane-carboxylate), 3-methyl-1,5-pentanediol bis(3,4-epoxycyclohexane-carboxylate), 1,5-pentanediol bis(3,4-epoxycyclohexane-carboxylate), ethylene glycol bis(3,4-epoxycyclohexane-carboxylate), ethylene glycol bis(3,4-epoxy-6-methylcyclohexane-carboxylate), bis(3,4-epoxycyclohexylmethyl) oxalate, bis(3,4-epoxycyclohexylmethyl) succinate, bis(3,4-epoxycyclohexylmethyl) adipate, and 1,2,8,9-diepoxylimonene.

The polymerizable composition may include the unsaturated nitrile compound and the alicyclic epoxy compound in amounts of 20 to 45 parts by weight and 3 to 25 parts by weight, respectively, based on 100 parts by weight of the aromatic vinyl compound.

The polymerizable composition may further include one or two or more compounds selected from the group consisting of $R_1COOH$, $R_2SO_3H$, and salt compounds thereof, and $R_1$ and $R_2$ may be independently $C_{6-30}$ alkyl, $C_{6-30}$ aryl, or $C_{6-30}$ alkyl$C_{6-30}$ aryl.

The polymerizable composition may include the acid compound in an amount of 0.05 to 1 part by weight based on 100 parts by weight of the aromatic vinyl compound.

The polymerizable composition may be mixed with water to form a dispersed phase, and the acid compound may be positioned at an interface between the dispersed phase and an aqueous phase so that the polymerizable composition is polymerized.

A surface of the emulsion polymer particle may be negatively charged.

An average particle size of the emulsion polymer particles may be 90 to 250 nm.

In another general aspect, a matting agent includes the emulsion polymer particles.

In still another general aspect, a master batch chip including the matting agent.

In still another general aspect, a matting polymer composition includes the matting agent and a thermoplastic polymer.

The thermoplastic polymer may be one or more selected from the group consisting of polypropylene (PP), polyacrylate, polyethylene terephthalate (PET), polybutylene terephthalate (PBT), polymethyl methacrylate (PMMA), polycarbonate (PC), polyamide, a styrene-acrylonitrile (SAN) copolymer, acrylonitrile-butadiene-styrene (ABS), acrylonitrile-styrene-acrylate (ASA), and a mixture thereof.

In still another general aspect, there is provided a molded article manufactured by extruding or injection-molding the matting polymer composition.

In still another general aspect, a method of producing emulsion polymer particles includes: producing a core layer by emulsion polymerization of a first polymerizable composition including an aromatic vinyl compound and an alicyclic epoxy compound; and producing a shell layer by emulsion polymerization of a second polymerizable composition including an aromatic vinyl compound, an unsaturated nitrile compound, and an alicyclic epoxy compound in the presence of the core layer.

The first polymerizable composition may include the alicyclic epoxy compound in an amount of 1 to 20 parts by weight based on 100 parts by weight of the aromatic vinyl compound, and the second polymerizable composition may include the alicyclic epoxy compound in an amount of 2 to 18 parts by weight based on a total of 100 parts by weight of the aromatic vinyl compound and the unsaturated nitrile compound.

The producing of the core layer may include:
(a) inputting the first polymerizable composition, deionized water, an emulsifier, and an acid compound to a reactor and stirring the first polymerizable composition, the deionized water, the emulsifier, and the acid compound to prepare a pre-emulsion; and
(b) initiating a reaction by adding a water-soluble initiator and performing emulsion polymerization.

The acid compound may be one or a combination of two or more selected from the group consisting of $R_1COOH$, $R_2SO_3H$, and salt compounds thereof, and $R_1$ and $R_2$ may be independently $C_{6-30}$ alkyl, $C_{6-30}$ aryl, or $C_{6-30}$ alkyl aryl.

The producing of the shell layer may include: adding dropwise the second polymerizable composition in the presence of the core layer and performing emulsion polymerization of the second polymerizable composition to prepare an emulsion polymer particle dispersion.

The core layer and the shell layer may be included in the emulsion polymer particle in amounts of 5 to 60 wt % and 40 to 95 wt %, respectively.

A solid content in the emulsion polymer particle dispersion may be 20 to 45 wt %.

Other features and aspects will be apparent from the following detailed description and the drawings.

DETAILED DESCRIPTION

Hereinafter, the present disclosure will be described in more detail with reference to specific exemplary embodiments or exemplary embodiments including the accompanying drawings. However, each of the following specific exemplary embodiments or exemplary embodiments is merely one reference example for describing the present disclosure in detail, and the present disclosure is not limited thereto and may be implemented in various forms.

In addition, unless otherwise defined, all the technical terms and scientific terms have the same meanings as commonly understood by those skilled in the art to which the present disclosure pertains. The terms used in the description of the present disclosure are merely used to effectively describe a specific exemplary embodiment, but are not intended to limit the present disclosure.

In addition, unless the context clearly indicates otherwise, the singular forms used in the specification and the scope of the appended claims are intended to include the plural forms.

In addition, unless explicitly described to the contrary, "comprising" any components will be understood to imply further inclusion of other components rather than the exclusion of any other components.

The term "matting" in the present specification refers to a property of reducing gloss by a diffuse reflection effect through differences in shrinkage and refractive index between polymers and between a polymer and an additive in an incompatible polymer composition or surface processing.

The term "dispersed phase" in the present specification may refer to a discontinuous phase distributed throughout a dispersion medium, and specifically, may refer to a discontinuous phase in which a polymerizable composition is distributed in the form of a droplet using water as a medium.

The term "pre-emulsion" in the present specification refers to a composition in a stable state in which a polymerizable composition, an emulsifier, and a solvent (deionized water) are homogeneously mixed.

The term "emulsion" in the present specification refers to a dispersion in which one of two liquids which do not dissolve in each other is dispersed in a small particle state in the other liquid.

Hereinafter, preferred exemplary embodiments and methods of measuring physical properties of a matting agent including emulsion polymer particles, a matting polymer composition including a matting agent, and a method of producing emulsion polymer particles of the present disclosure will be described in detail.

The present disclosure may be better understood by the following exemplary embodiments, and the following exemplary embodiments are not intended to describe purposes of the present disclosure and are not intended to limit the scope of protection limited by the appended claims.

Hereinafter, an exemplary embodiment of the present disclosure will be described in detail.

The present disclosure provides a matting agent including emulsion polymer particles, wherein the emulsion polymer particles are produced using a polymerizable composition including an aromatic vinyl compound, an unsaturated nitrile compound, and an alicyclic epoxy compound, and an epoxy group of the alicyclic epoxy compound is ring-opened.

The epoxy group of the alicyclic epoxy compound included in the emulsion polymer particles may be in a ring-opened state, and specifically, the ring-opened epoxy group may be ring-opened by reacting with other compounds included in the polymerizable composition. More specifically, the alicyclic epoxy compound may be included in the emulsion polymer particles by chemically bonding with a polymer, but is not limited thereto.

According to an exemplary embodiment of the present disclosure, as a non-limiting example, the aromatic vinyl compound may be one or more selected from the group consisting of styrene, α-methyl styrene, o-methyl styrene, p-methyl styrene, m-methyl styrene, ethyl styrene, isobutyl styrene, t-butyl styrene, o-bromo styrene, p-bromo styrene, m-bromo styrene, o-chloro styrene, p-chloro styrene, m-chloro styrene, vinyltoluene, vinylxylene, fluorostyrene, and vinylnaphthalene, and styrene may be used.

As a non-limiting example, the unsaturated nitrile compound may be one or more selected from the group consisting of acrylonitrile, methacrylonitrile, ethacrylonitrile, phenylacrylonitrile, and α-chloroacrylonitrile, and acrylonitrile may be used.

In some embodiments, the alicyclic epoxy compound may have two or more epoxy groups, specifically, the alicyclic epoxy compound may be one or more selected from the group consisting of 3,4-epoxycyclohexylmethyl 3,4-epoxycyclohexane-carboxylate, diethylene glycol bis(3,4-epoxycyclohexane-carboxylate), 2-ethyl-1,3-hexanediol bis(3,4-epoxycyclohexane-carboxylate), diethylene glycol bis(3,4-epoxy-6-methylcyclohexane-carboxylate), 3-methyl-1,5-pentanediol bis(3,4-epoxycyclohexane-carboxylate), 1,5-pentanediol bis(3,4-epoxycyclohexane-carboxylate), ethylene glycol bis(3,4-epoxycyclohexane-carboxylate), ethylene glycol bis(3,4-epoxy-6-methylcyclohexane-carboxylate), bis(3,4-epoxycyclohexylmethyl) oxalate, bis(3,4-epoxycyclohexylmethyl) succinate, bis(3,4-epoxycyclohexylmethyl) adipate, and 1,2,8,9-diepoxylimonene, and 3,4-epoxycyclohexylmethyl 3,4-epoxycyclohexane-carboxylate may be preferably used. As commercially available products such as CEL-2021, CEL-3000, and CEL-2081 manufactured by Daicel Chemical Industries, Ltd., and the like may be used.

According to an exemplary embodiment of the present disclosure, the polymerizable composition may include the unsaturated nitrile compound in an amount of 1 to 90 parts by weight, or 10 to 70 parts by weight, or 20 to 45 parts by weight, based on 100 parts by weight of the aromatic vinyl compound, and the polymerizable composition may include the alicyclic epoxy compound in an amount of 0.1 to 50 parts by weight, or 1 to 40 parts by weight, or 3 to 25 parts by weight, based on 100 parts by weight of the aromatic vinyl compound. When the above ranges are satisfied, the reaction stability may be maintained, emulsion polymer particles having physical properties desired in the present disclosure may be produced, and a matting effect may be effectively exerted even by adding a small amount of the matting agent including the emulsion polymer particles.

According to an exemplary embodiment of the present disclosure, the polymerizable composition may further include one or two or more compounds selected from the group consisting of $R_1COOH$, $R_2SO_3H$, and salt compounds thereof, and $R_1$ and $R_2$ may be independently $C_{6-30}$ alkyl, $C_{6-30}$ aryl, or $C_{6-30}$ alkyl$C_{6-30}$ aryl. In addition, the salt compound of the acid compound may be represented by $R_1COOM$ or $R_2SO_3M$, $R_1$ and $R_2$ may be the same as described above, and M may be a cation. M may be an alkali metal cation or an ammonium cation, and as a non-limiting example, M may be one or more selected from the group consisting of a sodium ion, a potassium ion, and a lithium ion, but is not limited thereto.

In some embodiments, the compound may be $R_2SO_3H$, and $R_2$ may be $C_{6-12}$ alkyl $C_{6-18}$ aryl, and as an example, the compound may be selected from butylbenzenesulfonic acid, octylbenzenesulfonic acid, dodecylbenzenesulfonic acid, and pentadecylbenzenesulfonic acid, but is not limited thereto. The compound may be included in an amount of 0.005 to 5 parts by weight, or 0.05 to 1 part by weight, based on 100 parts by weight of the aromatic vinyl compound of the polymerizable composition.

Specifically, the polymerizable composition may be mixed with water (medium) to form a dispersed phase, and the acid compound or the salt compound thereof may be positioned at an interface between the dispersed phase and an aqueous phase so that the polymerizable composition is polymerized. A specific description will be the same as described in a method of producing emulsion polymer particles below. In a case where emulsion polymerization is performed by further adding the acid compound to the polymerizable composition, the reactivity may be effectively improved, and emulsion polymer particles having a rigid crosslinked network may be produced.

In addition, the emulsion polymer particles may include divalent —$SO_3$— or —$CO_3$— substituents, specifically, —$SO_3$— substituents. The divalent substituents may be formed by reacting the acid compound included in the polymerizable composition with the alicyclic epoxy compound included in the polymerizable composition, and each of the divalent substituents may be bonded to a hydrocarbyl group. The divalent substituents may be included by being bonded to a polymer chain. In addition, the divalent substituents may be mainly present on a surface of the emulsion polymer particle, and may have a concentration gradient in which a concentration of the divalent substituents is decreased in a direction from the surface of the emulsion polymer particle to the inside of the particle. The concentration gradient may be derived from an emulsion polymerization mechanism. Specifically, as the acid compound is positioned at an interface of the dispersed phase, the divalent substituents may be present at a high concentration on the surface of the emulsion polymer particle through a reaction between the acid compound positioned at the interface and the alicyclic epoxy compound at the interface. The emulsion polymer particles having the above structure may have a uniform average particle size and may exert an excellent matting effect.

According to an exemplary embodiment of the present disclosure, a surface of the emulsion polymer particle may be negatively charged. The emulsion polymer particles may be produced by emulsion polymerization, and dispersibility of the polymerizable composition and the particles present in the medium, stability of the emulsion polymerization reaction, and the like may be improved using an emulsifier. For example, the emulsifier may be an anionic emulsifier, which may negatively charge the surface of the produced emulsion polymer particle. When a surface charge of the particle is negative, dispersion stability of micelles may be further improved.

According to an exemplary embodiment of the present disclosure, the average particle size of the emulsion polymer particles may be referred to as D50, and D50 refers to a particle size when a cumulative volume from a small particle size accounts for 50% in measuring a particle size distribution by a laser scattering method. In this case, as for D50, the particle size distribution may be measured by collecting the emulsion polymer particles according to KS A ISO 13320-1 standard using Mastersizer 3000 manufactured by Malvern Panalytical Ltd. Specifically, water may be used as a dispersion medium, and if necessary, the water is dispersed using an ultrasonic disperser, and then, a volume density may be measured, but the present disclosure is not limited thereto. In order to measure the average particle size, a commonly used or known method may be used.

The emulsion polymer particles according to an exemplary embodiment of the present disclosure are produced by emulsion polymerization. The emulsion polymer particles dispersed in the medium (water) after completion of the emulsion polymerization reaction are defined as first emulsion polymer particles, and the emulsion polymer particles in an agglomerated state after agglomeration are defined as second emulsion polymer particles. Hereinafter, unless otherwise specified, the emulsion polymer particles may refer to the first emulsion polymer particles, and in some cases, the emulsion polymer particles may include both the first emulsion polymer particles and the second emulsion polymer particles.

An average particle size of the first emulsion polymer particles may be 50 to 1,000 nm, or 70 to 500 nm, or 90 to 250 nm. The emulsion polymer particles having an average particle size within the above range may exert an excellent matting effect without deterioration of other physical properties even with the addition of a small amount. In addition, an average particle size of the second emulsion polymer particles may be 1 to 3,000 μm, 10 to 2,500 μm, or 50 to 2,000 μm, but is not limited thereto.

A particle size distribution of the first emulsion polymer particles may be 1 to 5, and specifically, 1 to 3, but is not limited thereto. The emulsion polymer particles satisfying the above range may have a uniform particle size distribution, and thus may improve the matting effect and appearance quality. The particle size distribution (SPAN) is measured using an optical diffraction particle size analyzer (Mastersizer 3000, manufactured by Malvern Panalytical Ltd.), and a particle size distribution (SPAN) value represented by the following Equation 1 is derived.

Particle size distribution (SPAN)=(Dv90−Dv10)/Dv50     Equation 1:

In Equation 1, Dv50 indicates that a particle size of a polymer particle among polymer particles produced through polymerization is a median value (medium), Dv90 indicates a particle size corresponding to the top 90% of the polymer particles produced through polymerization (90% from a small particle size to a large particle size), and Dv10 indicates a particle size corresponding to the top 10% of the polymer particles through polymerization (10% from a small particle size to a large particle size).

The present disclosure may provide a matting agent including the emulsion polymer particles. The first emulsion polymer particles produced by emulsion polymerization may be subjected to agglomeration, dehydration, and drying to obtain the second emulsion polymer particles in a powder form, and a matting agent including these emulsion polymer particles may be used.

The present disclosure may provide a master batch chip including the matting agent. The master batch chip may include a thermoplastic polymer and a matting agent, and may further include one or two or more additives selected from the group consisting of an antioxidant, a UV absorber, a UV stabilizer, a lubricant, and a mixture thereof. The additive may be used without limitation as long as it is commonly used or known. The matting agent may be included in an amount of 0.1 to 50 wt %, or 5 to 30 wt %, based on the total weight of the master batch chip. When the mater batch chip in the above range is used, dispersibility and uniformity of contents of the matting agent and the additive are improved, such that a high-quality product (molded article) may be manufactured.

The present disclosure may provide a matting polymer composition including the matting agent and a thermoplastic polymer. The matting agent may effectively exhibit the matting properties without deterioration of the existing physical properties of a thermoplastic polymer even with the addition of a small amount, and has a dense degree of crosslinking and a uniform particle size distribution and thus has excellent dispersibility with the thermoplastic polymer. The problems of the related art may be solved using the matting agent, and a low-gloss and matte product having excellent mechanical strength may be manufactured by extrusion or injection-molding processing of the matting polymer composition.

According to an exemplary embodiment of the present disclosure, the thermoplastic polymer may be one or more selected from the group consisting of polypropylene (PP), polyacrylate, polyethylene terephthalate (PET), polybutylene terephthalate (PBT), polymethyl methacrylate (PMMA), polycarbonate (PC), polyamide, a styrene-acrylonitrile (SAN) copolymer, acrylonitrile-butadiene-styrene (ABS), acrylonitrile-styrene-acrylate (ASA), and a mixture thereof. Specifically, a mixture of PC and SAN, a mixture of PC and ABS, or a mixture of PC and ASA may be used, but the present disclosure is not limited thereto.

According to an exemplary embodiment of the present disclosure, the matting agent and the thermoplastic polymer may be included in the matting polymer composition in amounts of 0.1 to 30 wt % and 70 to 99.9 wt %, respectively, but are not limited thereto, and the amount of the matting agent added may be adjusted depending on surface gloss of a product to be manufactured.

According to an exemplary embodiment of the present disclosure, the matting polymer composition may further include an additive commonly used in the related art depending on the purpose and use. For example, the matting polymer composition may further include an antioxidant, a UV absorber, a UV stabilizer, a lubricant, and the like. In this case, the additives may be included in an appropriate amount within a range in which the physical properties desired in the present disclosure are not impaired.

According to an exemplary embodiment of the present disclosure, the matting agent may be produced into a master batch chip including a thermoplastic polymer, and then may be mixed with a thermoplastic polymer again, and the master batch chip may further include an additive. The master batch chip may be included in an amount of 0.1 to 50 wt %, or 1 to 30 wt %, based on the total weight of the matting polymer composition, a content of the matting agent in a product to be finally manufactured may be determined by adjusting the amount of the mater batch chip added.

The present disclosure may provide a molded article manufactured by extruding or injection-molding the matting polymer composition. It was very difficult to manufacture a molded article having an excellent matting effect in extrusion processing in the related art. However, the matting polymer composition of the present disclosure to which the matting agent including the emulsion polymer particles is applied may not only effectively suppress appearance defects due to particle protrusion in extrusion processing, but also may produce a molded article having excellent matting properties and excellent quality appearance without impairing the existing mechanical properties of a polymer.

Hereinafter, a method of producing emulsion polymer particles according to the present disclosure will be described in detail.

The present disclosure may provide a method of producing emulsion polymer particles, the method including: producing a core layer by emulsion polymerization of a first polymerizable composition including an aromatic vinyl compound and an alicyclic epoxy compound; and producing a shell layer by emulsion polymerization of a second polymerizable composition including an aromatic vinyl compound, an unsaturated nitrile compound, and an alicyclic epoxy compound in the presence of the core layer.

According to an exemplary embodiment of the present disclosure, the first polymerizable composition may include the alicyclic epoxy compound in an amount of 1 to 30 parts by weight, or 1 to 25 parts by weight, or 1 to 20 parts by weight, based on 100 parts by weight of the aromatic vinyl compound. The first polymerizable composition may further include, but is not limited to, an unsaturated nitrile compound, and the unsaturated nitrile compound may be included in an amount of 5 to 70 parts by weight, or 10 to 50 parts by weight, based on 100 parts by weight of the aromatic vinyl compound. In the case where the first polymerizable composition further includes an unsaturated nitrile compound, a matting effect and mechanical properties such as impact strength and tensile strength may be improved in extrusion processing.

According to an exemplary embodiment of the present disclosure, the second polymerizable composition may include the unsaturated nitrile compound in an amount of 5 to 80 parts by weight, or 10 to 70 parts by weight, or 20 to 60 parts by weight, based on 100 parts by weight of the aromatic vinyl compound, and the second polymerizable composition may include the alicyclic epoxy compound in an amount of 0.5 to 50 parts by weight, or 1 to 25 parts by weight, or 2 to 18 parts by weight, based on the total of 100 parts by weight of the aromatic vinyl compound and the unsaturated nitrile compound. When the above ranges are satisfied, the reaction stability may be maintained, and a dense crosslinked structure may be formed inside and between the core layer and the shell layer.

In addition, the first polymerizable composition and the second polymerizable composition may further include a crosslinking agent. The crosslinking agent may be used without great limitation as long as the number of crosslinkable functional groups is two or more, and as a non-limiting example, 1,2-ethanediol di(meth)acrylate, 1,3-propanediol di(meth)acrylate, 1,3-butanediol di(meth)acrylate, 1,4-butanediol di(meth)acrylate, 1,5-pentanediol di(meth)acrylate, 1,6-hexanediol di(meth)acrylate, ethylene glycol di(meth)acrylate, propylene glycol di(meth)acrylate, butylene glycol di(meth)acrylate, triethylene glycol di(meth)acrylate, polyethylene glycol di(meth)acrylate, polypropylene glycol di(meth)acrylate, polybutylene glycol di(meth)acrylate, allyl (meth)acrylate, divinylbenzene, trivinylbenzene, trialkylisocyanurate, and the like may be used. The crosslinking agent may be used in an amount of 0.1 to 10 parts by weight, or 0.1 to 3 parts by weight, based on 100 parts by weight of the aromatic vinyl compound, but is not limited thereto.

In addition, the first polymerizable composition and the second polymerizable composition may further include a molecular weight modifier to control the molecular weight. As the molecular weight modifier, n-dodecyl mercaptan, n-amyl mercaptan, t-butyl mercaptan, t-dodecyl mercaptan, n-hexyl mercaptan, n-octyl mercaptan, n-nonyl mercaptan, and the like may be used, and the molecular weight modifier may be used in an amount of 0.001 to 10 parts by weight, or 0.01 to 5 parts by weight, based on 100 parts by weight of the aromatic vinyl compound, but is not limited thereto.

According to an exemplary embodiment of the present disclosure, the producing of the core layer may include: (a) inputting the first polymerizable composition, deionized water, an emulsifier, and an acid compound to a reactor and stirring the first polymerizable composition, the deionized water, the emulsifier, and the acid compound to prepare a pre-emulsion; and (b) initiating a reaction by adding a water-soluble initiator and performing emulsion polymerization.

Specifically, in (a) above, which is a step of stirring the first polymerizable composition, the deionized water, the emulsifier, and the acid compound at room temperature to prepare a pre-emulsion, emulsifying may be performed with a sufficient time and stirring speed, and the reaction stability may be more excellent as the emulsion state of the pre-emulsion is more excellent. Therefore, the time and stirring speed are not greatly limited, but for example, when a reactor with a capacity of 2 L is used, the stirring is performed at a stirring speed of 200 rpm or more for a stirring time of 10 minutes or longer. In this case, a commonly used or known auxiliary emulsifier, buffer (pH adjuster), molecular weight modifier, and the like may be further used.

In (a) above, the first polymerizable composition forms a dispersed phase using deionized water (aqueous phase) as a medium, and sufficient stirring may be performed so that droplets of the dispersed phase are small and uniformly spread. In addition, the emulsifier and the acid compound may be positioned at an interface between the aqueous phase and the dispersed phase, and polymerization of the polymerizable composition may be performed at the interface.

In (b) above, which is a step of increasing an internal temperature of the reactor to 50 to 70° C. and then initiating a reaction by adding a water-soluble initiator, as the reaction proceeds, an exothermic reaction may occur, and a cooler may be used to constantly maintain the temperature of the reactor at 65 to 75° C. The reaction time may be 10 to 200 minutes, (b) above may further include performing additional polymerization, and the additional polymerization may be performed at 60° C. to 75° C. for 30 to 120 minutes, but is not limited thereto. The core layer of the emulsion polymer particle may be produced through (a) and (b) above, and in this case, a polymerization conversion rate may be 70 to 99%.

Subsequently, the shell layer may be produced by slowly adding dropwise the second polymerizable composition in the presence of the core layer and performing emulsion polymerization of the second polymerizable composition to prepare the emulsion polymer particle dispersion. Specifically, the second polymerizable composition may be added dropwise to the core layer at a constant flow rate for 30 minutes to 5 hours, and the reaction temperature may be constantly maintained at 60 to 80° C. In addition, the second polymerizable composition may further include an auxiliary emulsifier, a buffer (pH adjuster), a molecular weight modifier, and the like. After completion of the reaction, the method of producing emulsion polymer particles may further include performing cooling to 40° C. or lower. A dispersion in which first emulsion polymer particles including a core layer and a shell layer are dispersed may be obtained by the above processes, a final polymerization conversion rate may be 95 to 99.9%, and the dispersion may include 20 to 45 wt % of the first emulsion polymer particles. In addition, the core layer and the shell layer are included in the first emulsion polymer particle in amounts of 5 to 60 wt % and 40 to 95 wt %, respectively. A specific description of the produced first emulsion polymer particles is the same as described above.

In addition, agglomerating the dispersion including the first emulsion polymer particles may be further performed. In the agglomerating of the dispersion including the first emulsion polymer particles, the first emulsion polymer particles are agglomerated using an acid solution or a salt solution to separate the first emulsion polymer particles from the medium (water), the surface of the particle is solidified by raising the temperature, and then dehydration and drying processes are performed, and as a result, second emulsion polymer particles in the form of white powder having a moisture content of 0.5 wt % or less may be obtained. In this case, a known or commonly used coagulant may be used as a coagulant, and for example, sulfuric acid, phosphoric acid, magnesium sulfate, and the like may be used. A specific description of the produced second emulsion polymer particles is the same as described above.

According to an exemplary embodiment of the present disclosure, the emulsifier lowers an interfacial energy between the polymerizable composition as a dispersed phase and the aqueous phase as deionized water so that a more uniform dispersed phase may be maintained, and thus stable emulsion polymerization may be performed. The emulsifier may be one or more selected from cationic, anionic, and nonionic surfactants, and as a non-limiting example, a cationic surfactant such as octyl trimethyl ammonium hydroxide, dodecyl trimethyl ammonium hydroxide, hexadecyl trimethyl ammonium hydroxide, octyl dimethyl benzyl ammonium hydroxide, decyl dimethyl dimethyl benzyl ammonium hydroxide, didodecyl dimethyl ammonium hydroxide, or dioctadecyl dimethyl ammonium hydroxide; an anionic surfactant such as an alkali metal soap with a high fatty acid, an alkylaryl sulfonate such as sodium dodecylbenzene sulfonate, potassium rosinate, potassium fatty acid, alkenyl dicarboxyl potassium, sodium lauryl sulfate, sodium dodecyl sulfate, sodium lauryl ether sulfate, sodium dodecylbenzene sulfate, alkyl sulfate, alkyl ether sulfate, alkyl phenyl ether sulfate, alkyl benzene sulfonate, alkyl sulfonate, or dialkyl sulfosuccinate; and a nonionic surfactant such as a condensate of ethylene oxide with a fatty acid such as a long-chain fatty alcohol or $C_{12-16}$ alcohol, a condensate of ethylene oxide with an amine or an amide, a condensate of ethylene with propylene oxide, glycerol, sucrose, sorbitol, fatty acid alkylol amide, sucrose ester, fatty amine oxide, polyoxyalkylene sorbitan ether, an ethylene glycol-propylene glycol copolymer, alkylpolysaccharide, polyvinyl alcohol (PVA), or polyvinylmethyl ether may be used alone or as a mixture thereof. Potassium rosinate and dodecylbenzenesulfonic acid may be used, and may be included in an amount of 0.1 to 5 parts by weight, or 1 to 3 parts by weight, based on 100 parts by weight of the polymerizable composition, but the present disclosure is not limited thereto.

According to an exemplary embodiment of the present disclosure, the compound may be one or a combination of two or more selected from the group consisting of $R_1COOH$, $R_2SO_3H$, and salt compounds thereof, and $R_1$ and $R_2$ may be independently $C_{6-30}$ alkyl, $C_{6-30}$ aryl, or $C_{6-30}$ alkyl$C_{6-30}$ aryl. A description of the compound and an example of a specific compound are the same as described above.

In addition, a weight ratio of the alicyclic epoxy compound to the acid compound in the first polymerizable composition may be 1:0.005 to 0.5, or 1:0.01 to 0.2. When the above range is satisfied, the reaction stability may be maintained, and emulsion polymer particles having uniform particle size and particle size distribution may be produced. When a matting agent including the emulsion polymer particles is used, a molded article having an improved matting effect and appearance quality may be manufactured without deterioration of mechanical properties even with the addition of a small amount of the emulsion polymer particles.

According to an exemplary embodiment of the present disclosure, the water-soluble initiator may be used without particular limitation as long as it is an initiator commonly used for emulsion polymerization or a known compound, and as a non-limiting example, peroxides such as potassium persulfate, sodium persulfate, and ammonium persulfate, and the like may be used. The water-soluble initiator may be included in an amount of 0.01 to 5 parts by weight, or 0.01 to 1 part by weight, based on 100 parts by weight of the polymerizable composition, but is not limited thereto.

Hereinafter, the present disclosure will be described in more detail with reference to Examples and Comparative Examples. However, the following Examples and Comparative Examples are only examples for describing the present disclosure in more detail, and the present disclosure is not limited by the following Examples and Comparative Examples.

Physical Property Measurement Methods

1) Average particle size: An average particle size was measured using a particle size analyzer (Mastersizer 3000, manufactured by manufactured by Malvern Panalytical Ltd.).

2) Surface gloss: Surface gloss was measured at 60° and 85° according to ASTM D523.

3) Notched IZOD impact strength: Impact strength was measured at ¼" and ⅛" according to ASTM D256.

4) Tensile strength: Tensile strength was measured according to ASTM D638.

5) Yellow index (YI): An injection-molded article having a thickness of 3.2 mm was manufactured and a yellow index was measured according to ASTM D1925.

Example 1: Production of Emulsion Polymer Particles (A) Production Process of Core Layer 23 g of styrene, 9 g of acrylonitrile, 3 g of 3,4-epoxycyclohexylmethyl-3,4-epoxycyclohexyl carboxylate (CEL-2021, manufactured by Daicel Chemical Industries, Ltd.), and 0.35 g of dodecylbenzenesulfonic acid (95 wt %, SAMCHUN CHEMICALS Co., Ltd.) were inputted to and stirred in a reactor. Thereafter, 200 g of deionized water and 2.0 g of potassium rosinate were additionally added, and the mixture was stirred at a stirring speed of 200 rpm or more for 30 minutes or longer. After confirming that the composition in the reactor was in a milky pre-emulsion state, the temperature was raised to 60° C. 0.15 g of potassium persulfate was added to the reactor to initiate the reaction, and then emulsion polymerization was performed for 2 hours while controlling the exothermic reaction and maintaining the internal temperature of the reactor at 70° C., thereby producing a core layer of an emulsion polymer particle (polymerization conversion rate 97%).

(B) Production Process of Shell Layer

Following (A) above, a composition obtained by mixing 43 g of styrene, 16 g of acrylonitrile, and 6 g of 3,4-epoxycyclohexylmethyl-3,4-epoxycyclohexyl carboxylate with each other was continuously added dropwise to a reactor at an internal temperature of 70° C. for 2 hours, and then emulsion polymerization was performed for 2 hours while controlling the exothermic reaction and maintaining the temperature at 70° C. After completion of the reaction, the internal temperature of the reactor was cooled to 40° C. or lower, and then a dispersion (emulsion) including emulsion polymer particles was obtained (polymerization conversion rate 98%, solid content 33%).

The emulsion was agglomerated using magnesium sulfate and then subjected to washing, dehydration, and drying, and then emulsion polymer particles in the form of white powder according to Example 1 were finally obtained. The measured average particle size of the emulsion polymer particles was 195 nm.

Example 2

The same procedure as that of Example 1 was performed, except that 32 g of styrene was added instead of acrylonitrile in (A) above of Example 1. The measured average particle size of the emulsion polymer particles was 160 nm.

Example 3

The same procedure as that of Example 1 was performed, except that 24 g of styrene and 2 g of 3,4-epoxycyclohexylmethyl-3,4-epoxycyclohexyl carboxylate were added in (A) above of Example 1, and 44 g of styrene, 17 g of acrylonitrile, and 4 g of 3,4-epoxycyclohexylmethyl-3,4-epoxycyclohexyl carboxylate were added in (B) above of Example 1. The measured average particle size of the emulsion polymer particles was 180 nm.

Example 4

The same procedure as that of Example 1 was performed, except that 8 g of acrylonitrile and 4 g of 3,4-epoxycyclohexylmethyl-3,4-epoxycyclohexyl carboxylate were added in (A) above of Example 1, and 42 g of styrene, 15 g of acrylonitrile, and 8 g of 3,4-epoxycyclohexylmethyl-3,4-epoxycyclohexyl carboxylate were added in (B) above of Example 1. The measured average particle size of the emulsion polymer particles was 215 nm.

Example 5

The same procedure as that of Example 1 was performed, except that 0.1 g of divinylbenzene was additionally added together with styrene in (A) above of Example 1, and 0.3 g of divinylbenzene was additionally added together with styrene in (B) above of Example 1. The measured average particle size of the emulsion polymer particles was 140 nm.

Comparative Example 1

The same procedure as that of Example 1 was performed, except that dodecylbenzenesulfonic acid was not added and 3 g of divinylbenzene was added instead of 3,4-epoxycyclohexylmethyl-3,4-epoxycyclohexyl carboxylate in (A) above of Example 1, and 6 g of divinylbenzene was added instead of 3,4-epoxycyclohexylmethyl-3,4-epoxycyclohexyl carboxylate in (B) above of Example 1. The polymerization conversion rate of the obtained emulsion was 97% or more, and the solid content in the obtained emulsion was 36%. The subsequent process was performed in the same manner as that of Example 1. The measured average particle size of the emulsion polymer particles was 118 nm.

Manufacture of Injection-Molded Article and Extruded Sheet

Examples 6 to 10 and Comparative Examples 2 to 4

65.5 wt % of PC (3020PJ), 11.4 wt % of ABS (IM-601), 18 wt % of SAN (92HR), and 0.3 wt % of an antioxidant were mixed with 4.7 wt % of each of the emulsion polymer particles (as a matting agent) according to Examples 1 to 5 and Comparative Example 1, matting polymer composition pellets were obtained through an extruder, and then the pellets were dried, thereby preparing a specimen having a size of 70 mm in width×75 mm in length×3.0 mm in thickness through an injection machine and a sheet-like specimen having a size of 100 mm in width×75 mm in length×2.0 mm in thickness through a single sheet extruder. The physical properties of the produced injection-molded article and extruded sheet were measured. The results are shown in Table 1.

Comparative Example 5

The same procedure as that of Example 6 was performed, except that the same amount of SAN Gel-1 according to U.S. Patent Application Publication No. 5580924 was added instead of the emulsion polymer particles. The physical properties of the produced injection-molded article and extruded sheet were measured. The results are shown in Table 1.

Examples 11 to 15 and Comparative Examples 6 to 8

The same procedure as that of Example 6 was performed, except that the same amount of ASA (XC-500A) was added instead of ABS (IM4-601). The physical properties of the produced injection-molded article and extruded sheet were measured. The results are shown in Table 2.

TABLE 1

| | Used emulsion polymer particles as a matting agent | Surface gloss 60° Injection-molded article | Surface gloss 60° Extruded sheet | 85° Extruded sheet | IZOD impact strength [J/m] ¼" | IZOD impact strength [J/m] ⅛" | Tensile strength [MPa] | Yellow index |
|---|---|---|---|---|---|---|---|---|
| Example 6 | Example 1 | 8.0 | 7.3 | 16.1 | 22.1 | 56.4 | 565 | 15.1 |
| Example 7 | Example 2 | 9.5 | 10.2 | 20.3 | 18.0 | 51.2 | 559 | 13.8 |
| Example 8 | Example 3 | 9.5 | 8.7 | 16.8 | 20.5 | 57.0 | 561 | 15.8 |
| Example 9 | Example 4 | 8.0 | 8.5 | 16.3 | 25.5 | 57.1 | 566 | 15.4 |
| Example 10 | Example 5 | 9.6 | 9.0 | 17.1 | 26.5 | 54.5 | 563 | 14.6 |
| Comparative Example 2 | Comparative Example 1 | 43.5 | 77.8 | 91.1 | 21.5 | 48.2 | 551 | 16.5 |
| Comparative Example 3 | BLENDEX BMAT | 11.4 | 34.9 | 48.6 | 15.6 | 47.1 | 567 | 21.2 |

TABLE 1-continued

| | Used emulsion polymer particles as a matting agent | Surface gloss | | 85° Extruded sheet | IZOD impact strength [J/m] | | Tensile strength [MPa] | Yellow index |
|---|---|---|---|---|---|---|---|---|
| | | 60° | | | | | | |
| | | Injection-molded article | Extruded sheet | | ¼" | ⅛" | | |
| Comparative Example 4 | XPHERE-NGR | 18.5 | 46.5 | 68.1 | 20.3 | 42.2 | 569 | 22.6 |
| Comparative Example 5 | SAN Gel-1 | 18.2 | 51.7 | 71.2 | 20.9 | 51.2 | 589 | 25.1 |

TABLE 2

| | Used emulsion polymer particles as a matting agent | Surface gloss | | 85° Extruded sheet | IZOD impact strength [J/m] | | Tensile strength [MPa] |
|---|---|---|---|---|---|---|---|
| | | 60° | | | | | |
| | | Injection-molded article | Extruded sheet | | ¼" | ⅛" | |
| Example 11 | Example 1 | 24.1 | 15.6 | 20.1 | 19.1 | 50.2 | 588 |
| Example 12 | Example 2 | 28.4 | 19.4 | 25.6 | 17.8 | 45.9 | 582 |
| Example 13 | Example 3 | 25.2 | 25.4 | 21.6 | 16.9 | 44.9 | 589 |
| Example 14 | Example 4 | 24.1 | 15.5 | 19.3 | 18.7 | 46.2 | 591 |
| Example 15 | Example 5 | 29.5 | 23.5 | 25.3 | 13.3 | 38.1 | 595 |
| Comparative Example 6 | Comparative Example 1 | 65.5 | 73.5 | 89.3 | 12.8 | 36.8 | 599 |
| Comparative Example 7 | BLENDEX BMAT | 14.4 | 36.5 | 42.1 | 10.6 | 18.6 | 587 |
| Comparative Example 8 | XPHERE-NGR | 18.8 | 58.7 | 66.8 | 18.5 | 38.4 | 591 |

BLENDEX BMAT: Styrene-acrylonitrile copolymer
XPHERE-NGR: Styrene-acrylonitrile copolymer As shown in Tables 1 and 2, it was confirmed that in the case of the sheet (molded article) manufactured by extrusion or injection-molding processing of the matting polymer composition including the emulsion polymer particles of the present disclosure, the surface gloss was effectively reduced, and specifically, in the cases of Examples 6 to 10 in which the emulsion polymer particles of the present disclosure were applied to PC/ABS, mechanical properties such as impact strength and tensile strength were not significantly changed, and a more excellent matting effect and a lower yellow index than in Comparative Examples 3 and 4 to which a commercially available product was applied.

In particular, from the results in which in all of Comparative Examples 2 to 4 and Comparative Examples 6 to 8, the surface gloss at 85' was 40 or more, whereas in all of Examples 6 to 15, the surface gloss at 85' was 30 or less, it was confirmed that in the case where the matting agent (emulsion polymer particles) according to the present disclosure was used, the matting effect in the extrusion processing, which was difficult to be implemented in the related art, was significantly effectively exerted. In addition, the appearance of the sheet according to Example 6 was excellent, whereas the appearance of the sheet of Comparative Example 5 was determined to be defective because the surface was significantly uneven and had a large number of black spots.

As a result of comparing Examples 6, 8, and 9 using the emulsion polymer particles of Examples 1, 3, and 4, it could be confirmed that in the case where 3 to 25 parts by weight of the alicyclic epoxy compound based on 100 parts by weight of the aromatic vinyl compound was applied, in particular, in the case were 5 to 15 parts by weight of the alicyclic epoxy compound based on 100 parts by weight of the aromatic vinyl compound was applied, a more excellent matting effect was exerted.

As set forth above, the emulsion polymer particles according to the present disclosure may be produced by a simple process using an emulsion polymerization method, and may be relatively easy to control a degree of crosslinking. In addition, in a case where a matting polymer composition is prepared using a matting agent including the emulsion polymer particles, matting properties may be effectively exhibited without deterioration of other physical properties.

Further, in the case of the matting polymer composition, it is possible to manufacture a molded article having excellent appearance and matting effect without deterioration of the existing mechanical properties such as impact strength and tensile strength of a thermoplastic polymer, and in particular, an excellent matting effect may be exerted even in the extrusion processing, which has been difficult to achieve in the related art.

The matting agent of the present disclosure and the matting polymer composition including the same may be applied to various products such as vehicle interior/exterior materials, interior materials, and home appliances.

Hereinabove, although the present disclosure has been described by specific matters, limited exemplary embodiments, and drawings, they have been provided only for assisting in the entire understanding of the present disclosure. Therefore, the present disclosure is not limited to the exemplary embodiments. Various modifications and changes may be made by those skilled in the art to which the present disclosure pertains from this description.

Therefore, the spirit of the present disclosure should not be limited to the described exemplary embodiments, but the claims and all modifications equal or equivalent to the claims are intended to fall within the spirit of the present disclosure.

The invention claimed is:

1. A matting agent comprising emulsion polymer particles,
wherein the emulsion polymer particles are produced using a polymerizable composition including an aromatic vinyl compound, an unsaturated nitrile compound, and an alicyclic epoxy compound,
wherein the alicyclic epoxy compound has two or more epoxy groups,
wherein an average particle size of the emulsion polymer particles is 70 to 500 nm, and
wherein the emulsion polymer particles comprise a core layer and a shell layer.

2. The matting agent of claim 1,
wherein the alicyclic epoxy compound is one or more selected from the group consisting of 3,4-epoxycyclohexylmethyl 3,4-epoxycyclohexane-carboxylate, diethylene glycol bis(3,4-epoxycyclohexane-carboxylate), 2-ethyl-1,3-hexanediol bis(3,4-epoxycyclohexane-carboxylate), diethylene glycol bis(3,4-epoxy-6-methylcyclohexane-carboxylate), 3-methyl-1,5-pentanediol bis(3,4-epoxycyclohexane-carboxylate), 1,5-pentanediol bis(3,4-epoxycyclohexane-carboxylate), ethylene glycol bis(3,4-epoxycyclohexane-carboxylate), ethylene glycol bis(3,4-epoxy-6-methylcyclohexane-carboxylate), bis(3,4-epoxycyclohexylmethyl) oxalate, bis(3,4-epoxycyclohexylmethyl) succinate, bis(3,4-epoxycyclohexylmethyl) adipate, and 1,2,8,9-diepoxylimonene.

3. The matting agent of claim 1,
wherein the polymerizable composition contains the unsaturated nitrile compound and the alicyclic epoxy compound in amounts of 20 to 45 parts by weight and 3 to 25 parts by weight, respectively, based on 100 parts by weight of the aromatic vinyl compound.

4. The matting agent of claim 1,
wherein the polymerizable composition further includes one or a combination of two or more compounds selected from the group consisting of $R_1COOH$, $R_2SO_3H$, and salt compounds thereof, and
$R_1$ and $R_2$ are independently $C_{6-30}$ alkyl, $C_{6-30}$ aryl, or $C_{6-30}$ alkyl$C_{6-30}$ aryl.

5. The matting agent of claim 2,
wherein the polymerizable composition includes the compound in amounts of 0.05 to 1 part by weight, based on 100 parts by weight of the aromatic vinyl compound.

6. The matting agent of claim 4,
wherein the polymerizable composition is mixed with water to form a dispersed phase, and
the one or the combination of two or more compounds is positioned at an interface between the dispersed phase and an aqueous phase so that the polymerizable composition is polymerized.

7. The matting agent of claim 1,
wherein a surface of the emulsion polymer particle is negatively charged.

8. The matting agent of claim 1,
wherein an average particle size of the emulsion polymer particles is 90 to 250 nm.

9. A matting polymer composition comprising the matting agent of claim 1 and a thermoplastic polymer.

10. The matting polymer composition of claim 9,
wherein the thermoplastic polymer is one or more selected from the group consisting of polypropylene (PP), polyacrylate, polyethylene terephthalate (PET), polybutylene terephthalate (PBT), polymethyl methacrylate (PMMA), polycarbonate (PC), polyamide, a styrene-acrylonitrile (SAN) copolymer, acrylonitrile-butadiene-styrene (ABS), acrylonitrile-styrene-acrylate (ASA), and a mixture thereof.

* * * * *